(12) United States Patent
Gao et al.

(10) Patent No.: US 12,534,119 B2
(45) Date of Patent: Jan. 27, 2026

(54) STACKABLE CHARGING DEVICE FOR SHOPPING CARTS WITH ONBOARD COMPUTING SYSTEMS

(71) Applicant: Maplebear Inc., San Francisco, CA (US)

(72) Inventors: Lin Gao, Miami, FL (US); Yilin Huang, Shanghai (CN); Shiyuan Yang, Shanghai (CN); Jianbo Meng, Shanghai (CN); Yakun Li, Shanghai (CN); Linhua Luo, Shanghai (CN); Weiting Chen, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 697 days.

(21) Appl. No.: 17/936,226

(22) Filed: Sep. 28, 2022

(65) Prior Publication Data

US 2024/0034381 A1 Feb. 1, 2024

Related U.S. Application Data

(63) Continuation of application No. PCT/CN2022/109056, filed on Jul. 29, 2022.

(51) Int. Cl.
*B62B 3/14* (2006.01)
*A47F 10/04* (2006.01)
(Continued)

(52) U.S. Cl.
CPC ............ *B62B 3/1404* (2013.01); *B60L 53/16* (2019.02); *B62B 5/0053* (2013.01);
(Continued)

(58) Field of Classification Search
CPC ....... B62B 3/1404; B62B 3/14; B62B 5/0053; B62B 5/0096; B62B 2207/02;
(Continued)

(56) References Cited

U.S. PATENT DOCUMENTS

| 10,953,906 | B1* | 3/2021 | McMahon | ............ B62B 3/1424 |
| 2004/0164507 | A1* | 8/2004 | Otterlee | .................... B62B 9/00 |
| | | | | 280/33.993 |

(Continued)

FOREIGN PATENT DOCUMENTS

| CN | 103580297 A | 2/2014 |
| CN | 105720656 A | 6/2016 |

(Continued)

OTHER PUBLICATIONS

PCT International Search Report and Written Opinion, PCT Application No. PCT/CN2022/109056, Dec. 22, 2022, nine pages.

*Primary Examiner* — Drew A Dunn
*Assistant Examiner* — Daniel P Mcfarland
(74) *Attorney, Agent, or Firm* — Fenwick & West LLP

(57) ABSTRACT

An automated checkout system uses a shopping cart that is automatically charged when stacked into another shopping cart. Each shopping cart has a front charging connector and a rear charging connector. When a first shopping cart is stacked into a second shopping cart, the front charging connector of the first shopping cart connects with the rear charging connector of the second shopping cart. Electrical power can flow to the first shopping cart via the second shopping cart to charge a battery of the first shopping cart. The second shopping cart may be similarly stacked into a third shopping cart, wherein the second shopping cart receives electrical power from the third shopping cart. The second shopping cart may use this electrical power to charge its own battery or may provide some or all of the electrical power to the first shopping cart to charge the first shopping cart's battery.

15 Claims, 6 Drawing Sheets

(51) Int. Cl.
*B60L 53/16* (2019.01)
*B62B 5/00* (2006.01)
*H02J 7/00* (2006.01)

(52) U.S. Cl.
CPC .......... *B62B 5/0096* (2013.01); *H02J 7/0013* (2013.01); *H02J 7/0045* (2013.01); *A47F 10/04* (2013.01); *B60L 2200/30* (2013.01); *B62B 3/14* (2013.01); *B62B 2207/02* (2013.01); *H02J 7/0042* (2013.01)

(58) Field of Classification Search
CPC .... B60L 53/16; B60L 2200/30; H02J 7/0013; H02J 7/0042; H02J 7/0045; A47F 10/04; H01R 24/76; H01R 24/68; H01R 24/70; H01R 24/78; H01R 24/66; H01R 11/05; H01R 11/01; H01R 2201/26; H01R 13/642
USPC .......... 320/109, 137; 439/34, 246, 374, 919, 439/924.1, 924.2
See application file for complete search history.

(56) References Cited

U.S. PATENT DOCUMENTS

| | | | | |
|---|---|---|---|---|
| 2006/0254861 A1* | 11/2006 | Perrier | .................. | G07F 7/0627 186/26 |
| 2008/0231228 A1* | 9/2008 | Fowler | .................. | G06Q 30/02 320/107 |
| 2008/0231431 A1* | 9/2008 | Stawar | .................. | B62B 3/1408 340/8.1 |
| 2008/0238009 A1* | 10/2008 | Carpenter | .......... | G06Q 30/0633 280/33.992 |
| 2012/0296751 A1* | 11/2012 | Napper | ................ | G06Q 20/208 705/23 |
| 2013/0102162 A1* | 4/2013 | Holmes | ................ | H01R 13/629 439/34 |
| 2014/0108195 A1* | 4/2014 | Stawar | .................. | B62B 3/1408 705/26.8 |
| 2015/0349557 A1* | 12/2015 | Chen | ..................... | H02J 7/0013 320/120 |
| 2015/0349564 A1* | 12/2015 | Chen | ..................... | H02J 7/0042 439/638 |
| 2016/0039442 A1* | 2/2016 | Tilbürger | .............. | G07F 7/0681 280/33.992 |
| 2016/0257212 A1* | 9/2016 | Thompson | ........... | G05D 1/0289 |
| 2017/0282731 A1* | 10/2017 | Kwa | ....................... | B60L 53/35 |
| 2018/0006393 A1* | 1/2018 | Chen | ........................ | B62B 3/1404 |
| 2018/0366886 A1* | 12/2018 | Chen | ......................... | H02J 7/00 |
| 2018/0370554 A1* | 12/2018 | Raza | ........................ | B62B 3/1404 |
| 2019/0073656 A1* | 3/2019 | Joseph | ............. | G06Q 20/40145 |
| 2019/0092183 A1* | 3/2019 | Sussman | ................ | B60L 53/65 |
| 2019/0097443 A1* | 3/2019 | Kwa | ....................... | B60L 53/30 |
| 2019/0131800 A1* | 5/2019 | Chen | ......................... | H02J 7/00 |
| 2019/0291764 A1* | 9/2019 | Heiman | ................... | B62B 5/00 |
| 2020/0172140 A1* | 6/2020 | Yokoyama | ........... | B62B 3/1412 |
| 2020/0254895 A1* | 8/2020 | Kim | ....................... | H02J 7/0047 |
| 2020/0275059 A1* | 8/2020 | De Bonet | ............. | G06V 10/141 |
| 2020/0303953 A1* | 9/2020 | Oishi | ..................... | H02J 50/005 |
| 2021/0001911 A1* | 1/2021 | Kogoshi | ............... | B62B 3/1472 |
| 2021/0024112 A1* | 1/2021 | Ting | ......................... | B62B 3/10 |
| 2021/0057846 A1* | 2/2021 | Lai | ......................... | H01R 13/62 |
| 2021/0135496 A1* | 5/2021 | Kato | ....................... | H02J 50/40 |
| 2021/0135504 A1* | 5/2021 | Kato | ........................ | H02J 7/02 |
| 2021/0403065 A1* | 12/2021 | Sa | ........................ | B62B 5/0053 |
| 2022/0161675 A1* | 5/2022 | Kato | ....................... | H02J 7/0044 |
| 2022/0166263 A1* | 5/2022 | Kato | ....................... | H02J 50/40 |
| 2023/0264588 A1* | 8/2023 | Farr | ......................... | B60L 53/16 320/109 |

FOREIGN PATENT DOCUMENTS

| | | |
|---|---|---|
| CN | 109017950 A | 12/2018 |
| CN | 209805012 U | 12/2019 |
| CN | 111717264 A | 9/2020 |

\* cited by examiner

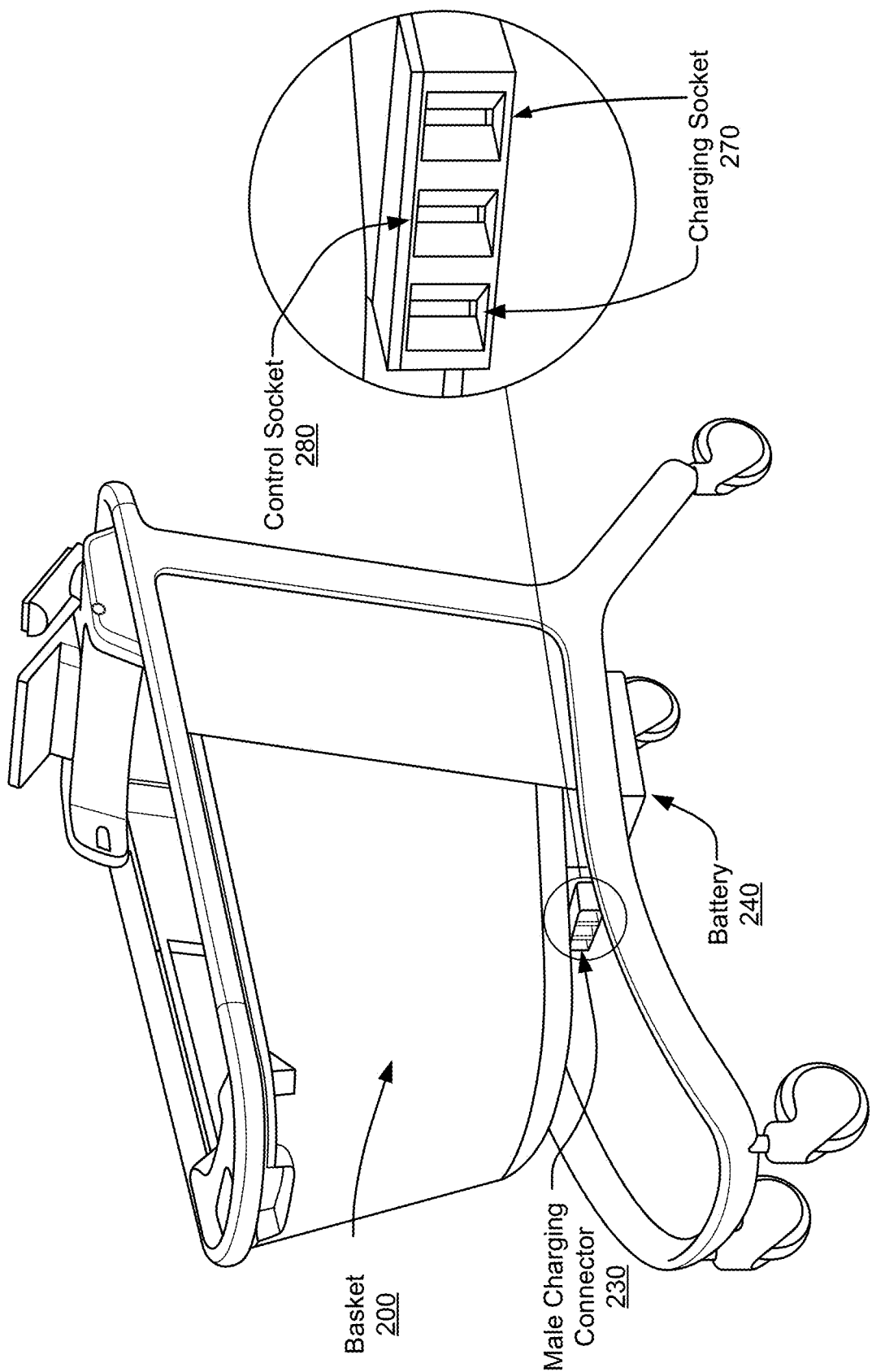

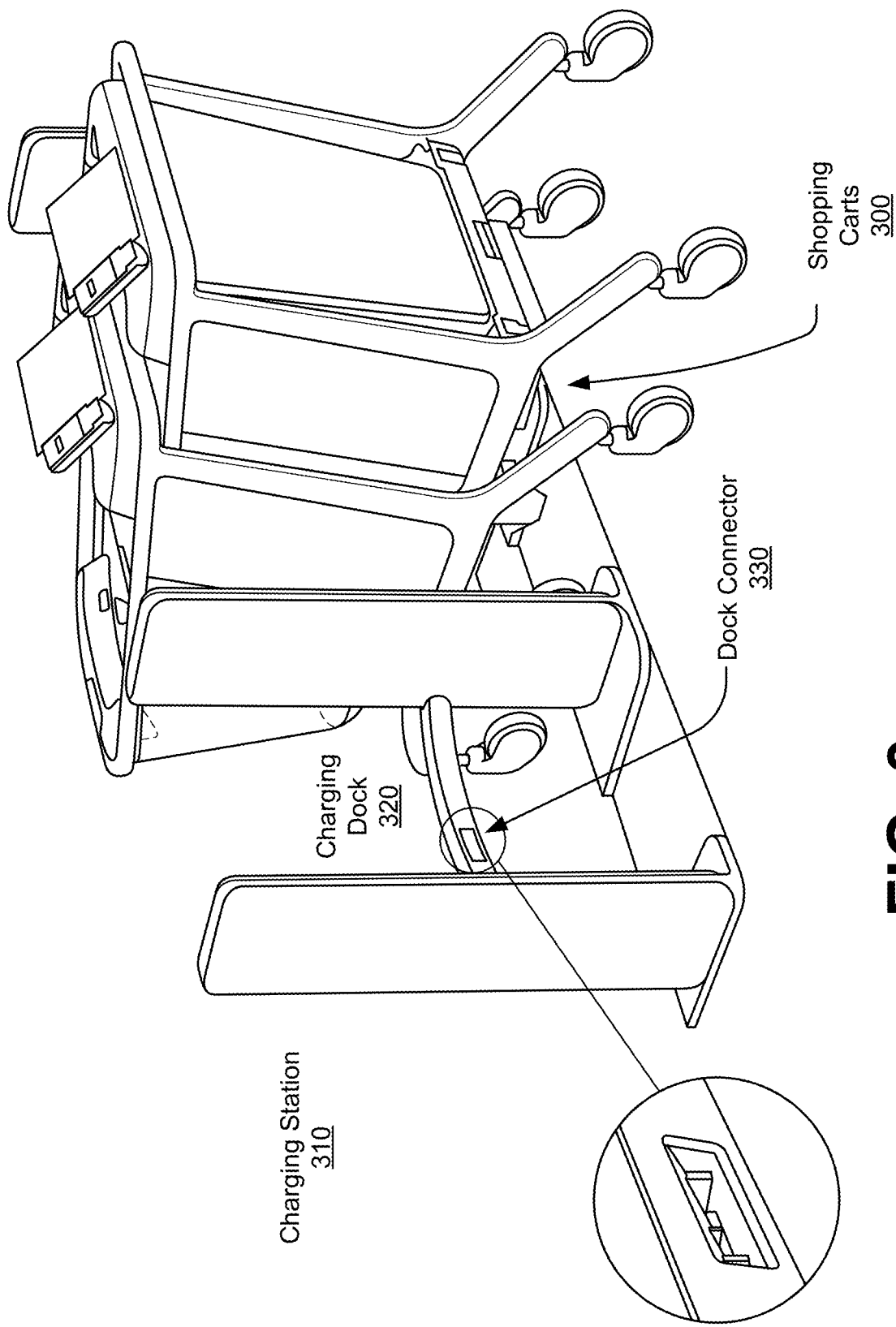

STACKABLE CHARGING DEVICE FOR SHOPPING CARTS WITH ONBOARD COMPUTING SYSTEMS

CROSS-REFERENCE TO RELATED APPLICATIONS

The present application is a continuation application of co-pending Patent Cooperation Treaty (PCT) International Application No. PCT/CN2022/109056 filed on Jul. 29, 2022, with the China National Intellectual Property Office as the Receiving Office, which is herein incorporated by reference.

BACKGROUND

Automated checkout systems allow a customer at a brick-and-mortar store to complete a checkout process for items without having to go through a cashier. Some of these systems allow users to complete a checkout process through a shopping cart that a user uses to carry items.

Users of an automated checkout system may use shopping carts that include automated checkout capabilities. These shopping carts include computing devices that capture data for use by the automated checkout system to identify items added by users and perform a checkout process by which the user pays for the items they purchase. These computing devices require a power source, such as a battery, to be coupled to the shopping cart. These batteries can be rechargeable, allowing the shopping cart to be used over an extended period of time without replacing the battery.

However, conventional charging systems are ineffective for charging shopping carts for an automated checkout system. Because of technical constraints, these conventional systems require a user or operator to charge each shopping cart individually, typically by connecting a charging cable to a charging port on the shopping cart. This system is inconvenient because it requires users to remember to charge the shopping cart after use. Additionally, users may be inclined to not reconnect a shopping cart to a charging cable to save themselves time, even though it may cause the shopping cart to run low on power for a subsequent user. Thus, conventional systems are generally inconvenient for users, often leading to under-charged shopping carts.

SUMMARY

In accordance with one or more aspects of the disclosure, an automated checkout system uses a shopping cart that is automatically charged when stacked into another shopping cart. Each shopping cart has a front charging connector and a rear charging connector. When a first shopping cart is stacked into a second shopping cart (i.e., a basket of the first shopping cart is at least partially within the basket of the second shopping cart), the front charging connector of the first shopping cart connects with the rear charging connector of the second shopping cart. Electrical power can flow to the first shopping cart via the second shopping cart to charge a battery of the first shopping cart. The second shopping cart may be similarly stacked into a third shopping cart, wherein the second shopping cart receives electrical power from the third shopping cart. The second shopping cart may use this electrical power to charge its own battery or may provide some or all of the electrical power to the first shopping cart to charge the first shopping cart's battery. Any number of shopping carts may be stacked together to allow some or all of the batteries of the shopping carts to be charged by electrical power flowing through the stack of shopping carts.

Shopping carts may be charged by stacking the shopping carts into a dock of a charging station. The charging station includes charging docks with dock connectors that connect with the front charging connector of a shopping cart to provide electrical power to a stack of shopping carts. The first shopping cart (i.e., the shopping cart that is directly connected to the docking station) may provide the electrical power from a dock connector of the docking station to power other shopping carts in the stack. In some embodiments, this electrical power is distributed to all of the shopping carts in a stack. Alternatively, the electrical power may be primarily or entirely routed to the last shopping cart in the stack (i.e., the shopping cart that does not have another shopping cart stacked into it). Each shopping cart in the stack may determine whether another shopping cart is connected to its rear charging connector, and if so, route electrical power that it receives to the shopping cart that is stacked into it. If the shopping cart does not detect that another shopping cart is stacked into it, the shopping cart uses the electrical power to charge its battery. In some embodiments, the charging station transmits a cart identifier to the shopping carts in a stack and only the shopping cart that corresponds to the cart identifier is charged with electrical power received from the charging station.

By providing a stackable charging system for a shopping cart, a user of an automated checkout system can easily and intuitively charge shopping carts by simply stacking them together. Furthermore, the described stacked charging system reduces the burden on an operator of an automated checkout system by reducing how often an operator must manually connect a shopping cart with a charging system.

BRIEF DESCRIPTION OF DRAWINGS

FIG. 2B illustrates the shopping cart from a front, perspective view, in accordance with some embodiments.

FIG. 3 illustrates stacked shopping carts that are placed within a charging station, in accordance with some embodiments.

DETAILED DESCRIPTION

Example System Environment for Automated Checkout System

Figure 1:
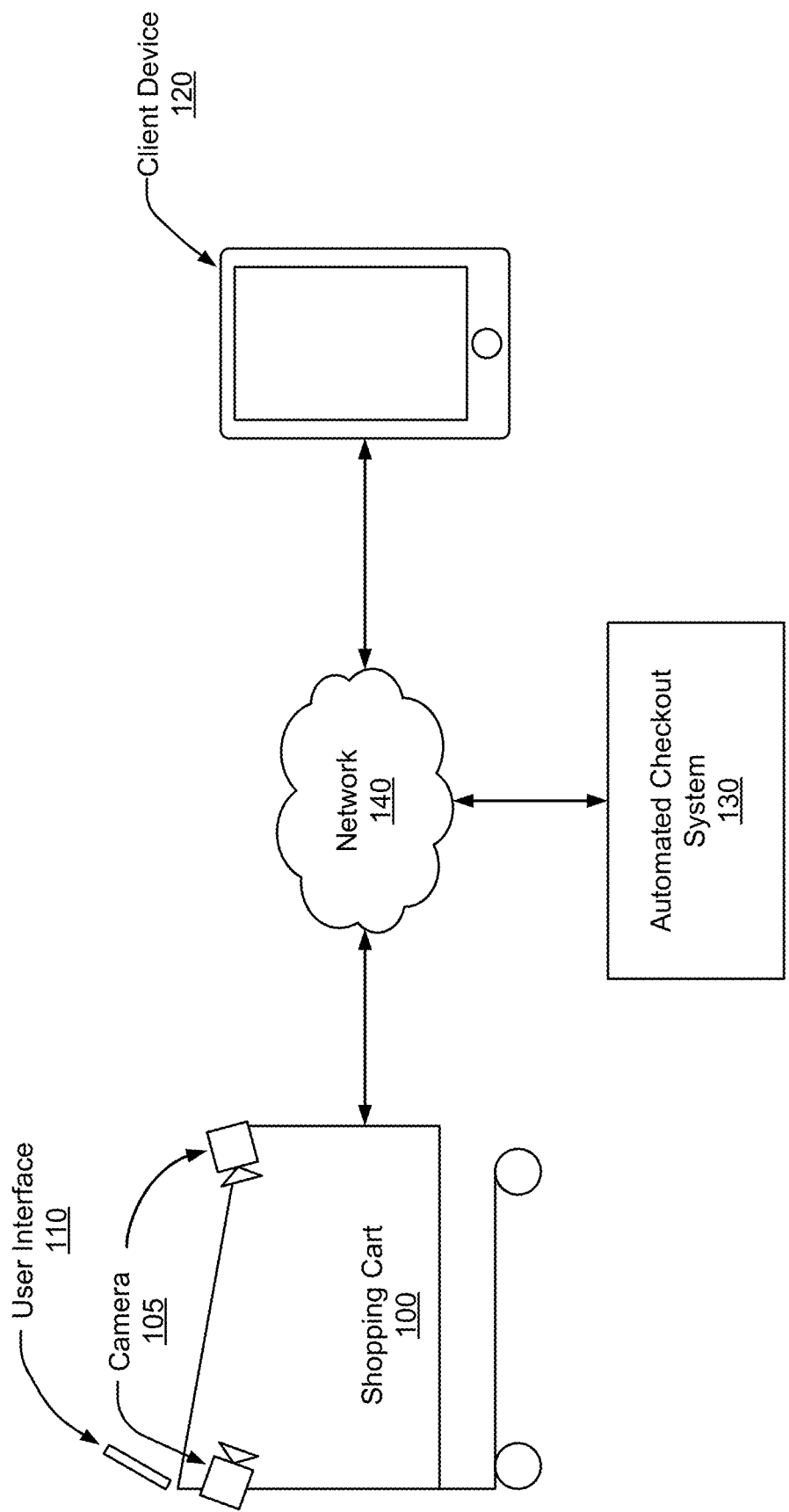
FIG. 1 illustrates an example system environment for an automated checkout system, in accordance with some embodiments.

FIG. 1 illustrates an example system environment for an automated checkout system, in accordance with some embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in some embodiments, by the automated checkout system 130 or the client device 120. Similarly, functionality described below as being performed by the automated checkout system 130 may, in some embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In some embodiments, the cameras 105 include embedded processing capabilities to process image data captured by the cameras 105. For example, the cameras 105 may be MIPI cameras.

The shopping cart 100 may include one or more sensors that capture measurements describing the shopping cart 100, items in the shopping cart's storage area, or the area around the shopping cart 100. For example, the shopping cart 100 may include load sensors that measure the weight of items placed in the shopping cart's storage area. Similarly, the shopping cart 100 may include proximity sensors that capture measurements for detecting when an item is being added to the shopping cart 100. The shopping cart 100 may transmit data from the one or more sensors to the automated checkout system 130.

In some embodiments, the shopping cart 100 captures a set of image data in response to detecting that an item is being added to the storage area. The shopping cart 100 may detect that an item is being added based on sensor data from sensors on the shopping cart 100. For example, the shopping cart 100 may detect that a new item has been added when the shopping cart 100 detects a change in the overall weight of the contents of the storage area based on load data from load sensors. Similarly, the shopping cart 100 may detect that a new item is being added based on proximity data from proximity sensors indicating that something is approaching the storage area of the shopping cart 100. The shopping cart 100 captures image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In some embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

A user can also interact with the shopping cart 100 or the automated checkout system 130 through a client device 120. The client device 120 can be a personal or mobile computing device, such as a smartphone, a tablet, a laptop computer, or desktop computer. In some embodiments, the client device 120 executes a client application that uses an application programming interface (API) to communicate with the automated checkout system 130 through the network 140.

The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 adjust the user's shopping list based on the identified item. In some embodiments, the user can also manually adjust their shopping list through the client device 120.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In some embodiments, the network 140 may include Bluetooth or near-field communication (NFC) technologies or protocols for local communications between computing devices. The network 140 may transmit encrypted or unencrypted data.

The automated checkout system 130 allows a customer at a brick-and-mortar store to complete a checkout process in which items are scanned and paid for without having to go through a human cashier at a point-of-sale station. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In some embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100.

The automated checkout system 130 generates a shopping list for the user as the user adds items to the shopping cart 100. The shopping list is a list of items that the user has gathered that the user intends to purchase. The shopping list may include identifiers for the items that the user has gathered (e.g., SKUs) and a quantity for each item. The automated checkout system 130 generates the shopping list based on image data captured by the cameras 105 on the shopping cart 100. For example, the automated checkout system 130 may apply a machine-learning model (e.g., a neural network) to image data from the shopping cart 100 to identify an item added to the cart.

In some embodiments, the automated checkout system 130 uses a barcode detection model to identify items in the shopping cart's storage area. A barcode detection model is a machine-learning model that is trained to identify items by identifying barcodes on the items based on image data from the cameras 105. The barcode detection model identifies portions of the image data that correspond to a barcode on an item and determines the item identifier (e.g., SKU) that is represented by the barcode.

The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

In some embodiments, a user who interacts with the shopping cart 100 or the client device 120 may be a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

Example Stackable Charging Shopping Cart

Figure 2A:
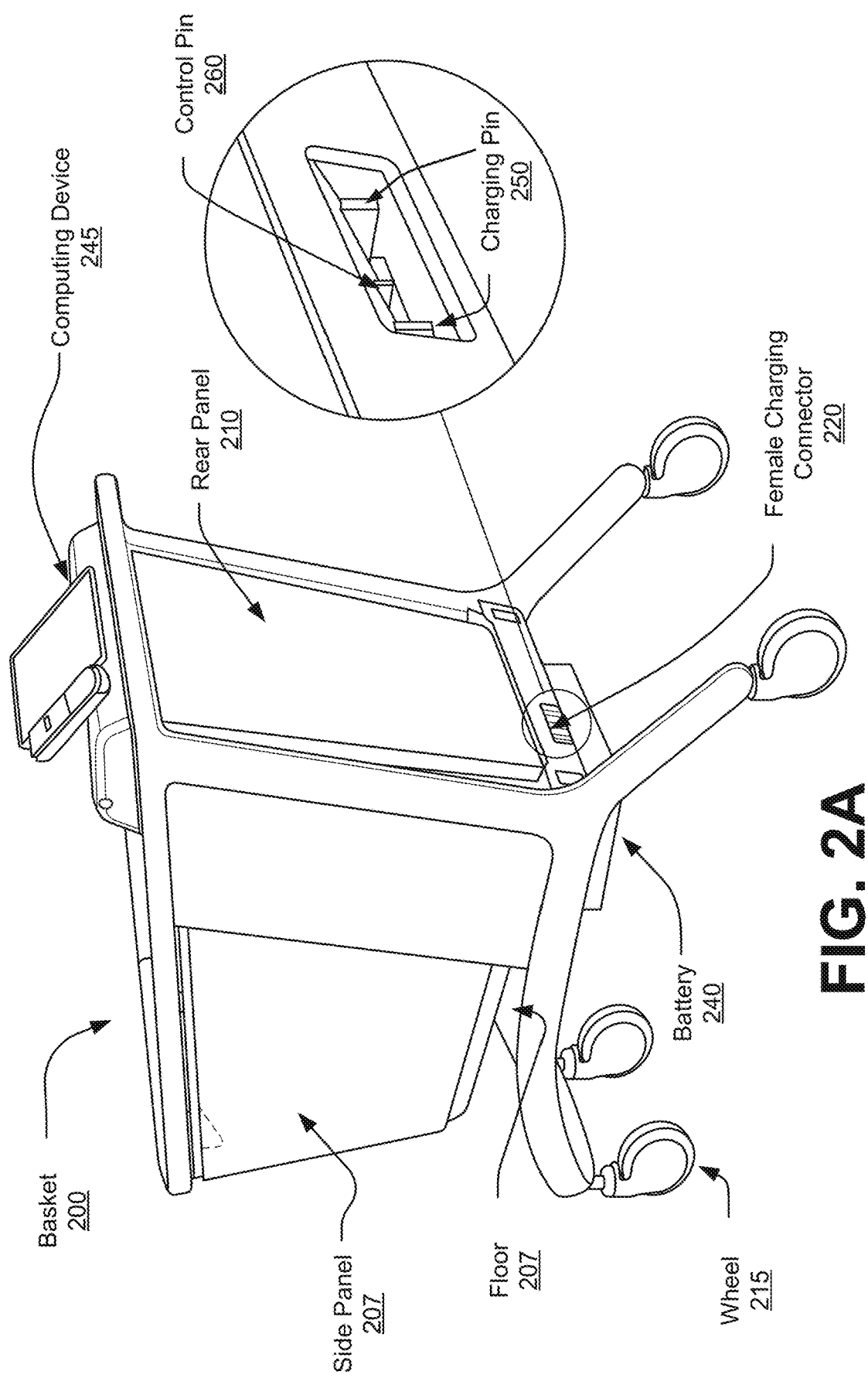
FIG. 2A illustrates the shopping cart from a rear, perspective view, in accordance with some embodiments.

FIGS. 2A and 2B illustrate an example shopping cart with stackable charging components, in accordance with some embodiments. FIG. 2A illustrates the shopping cart from a rear, perspective view. FIG. 2B illustrates the shopping cart from a front, perspective view. Alternative embodiments may include more, fewer, or different components from those illustrated in FIGS. 2A and 2B. Additionally, the components may be located in different positions or orientations on the shopping cart, or may be structured differently, from the specific illustrated embodiment in FIGS. 2A and 2B. FIGS. 2A and 2B illustrate example embodiments of the shopping cart 100 described with regards to FIG. 1.

The shopping cart includes a basket 200 that encompasses a storage area within which a user may place items for purchase. The basket 200 comprises a floor 205 that is substantially parallel to the ground and side panels 207 that are substantially orthogonal to the ground. The side panels 207 and floor 205 may comprise any of a variety of materials, such as metal, plastic, cloth, or wood. Similarly, the side panels 207 and floors 205 may be made of a solid, continuous material, or they may include perforations or formed from structures such as wires that form the panels 207 and floor 205 of the basket 200. In some embodiments, the basket 200 includes a rear panel 210 that is coupled to the shopping cart via a folding mechanism (e.g., a hinge), thereby allowing the rear panel 210 to fold into the shopping cart when another shopping cart is placed into the shopping cart. The shopping cart includes a set of wheels 215 that are coupled to the basket.

The shopping cart includes a computing device 245. The computing device 245 includes one or more processing units and one or more computer-readable media. The computing device 245 performs the functionality described above with regards to the shopping cart 100 of FIG. 1. The computing device 245 further includes a user interface, such as a display, speakers, a microphone, a keypad, a barcode scanner, or a payment interface. The computing device 245 is also coupled to the battery 240 such that the battery 240 provides power to the computing device 245. The computing device 245 may further include a networking component that allows the computing device 245 to communicate with other devices over a network (e.g., network 140). For example, the computing device 245 may include a WiFi card, an NFC card, or an RFID scanner. In some embodiments, the computing device 245 comprises a plurality of processing units located in different parts of the shopping cart. Each processing unit may be configured to perform different functionality. For example, the computing device 245 may include a CPU that controls a user interface and may include integrated circuitry that controls sensors coupled to the shopping cart.

The shopping cart includes a front charging connector and a rear charging connector. In the embodiment illustrated in FIGS. 2A and 2B, the rear charging connector is a female charging connector 220 located at the rear of the shopping cart and the front charging connector is a male charging connector 230 located at the front of the shopping cart. The female charging connector 220 of one shopping cart is positioned to receive the male charging connector 230 of another shopping cart stacked into the shopping cart. In some embodiments, the female charging connector 220 includes a lid that covers the female charging connector 220 not connected to a male charging connector 220. The lid may be coupled to a hinge that allows the lid to move out of the way of a male charging connector 230 when the male charging connector 230 is inserted into the female charging connector 220.

The female charging connector 220 comprises two charging pins 250 and the male charging connector 230 comprises two corresponding charging sockets 270. The charging pins 250 and the charging sockets 270 are coupled to the battery 240 such that they are able to provide power to or receive power from the battery 240. In some embodiments, the charging sockets 270 are coupled to their corresponding charging pins 250 such that electrical power can flow from the charging sockets 270 to the charging pins 250 (or vice versa) without passing through the battery 240. The computing device 245 may be able to control whether electrical power flowing between the charging sockets 270 and the charging pins 250 passes through the battery 240 such that the battery 240 is charged through that power.

In some embodiments, the computing device 245 uses a control pin 260 and a control socket 280 to control whether electrical power flows between the charging sockets 270 and the charging pins 250. The male charging connector 230 includes a control socket 280 and the female charging connector 220 includes a control pin 260. The computing device 245 restricts the flow of electrical power between the charging pins 250 and the charging sockets 270 if the computing device 245 does not detect that the control pin 260 is connected with a control socket 280 of another shopping cart. If the computing device 245 detects that the control pin 260 is connected to a control socket 280 of another shopping cart, the computing device 245 allows the flow of electrical power between the charging pins 250 and the charging sockets 270. The control pin 260 may be shorter than the charging pins 250, thereby ensuring that the charging pins 250 and the charging sockets 270 are in contact before the computing device 245 allows power to flow. Thus, the shopping cart reduces the likelihood that arcing will occur between charging pins 250 and charging sockets 270 as shopping carts are connected.

Alternative embodiments may differ from the specific embodiments illustrated in FIGS. 2A and 2B. For example, while the charging connectors 220/230 are illustrated as being coupled to the floor of the basket 200 of the shopping cart, the charging connectors 220/230 may be configured to connect in other locations on the shopping carts, such as on the side, front, or rear of the shopping cart. Additionally, the charging connectors 220/230 may be structured differently from the specific embodiment illustrated in FIGS. 2A and 2B. For example, the charging connectors may have a different shape or may have a different number of pins 250 or sockets 270. Additionally, while the front charging connector is illustrated as male and the rear charging connector is illustrated as female, alternative embodiments may have a front charging connector that is female and a rear charging connector that is male.

FIG. 3 illustrates stacked shopping carts 300 that are placed within a charging station 310, in accordance with some embodiments. The illustrated charging station 310 has three docks 320 within which a shopping cart may be placed, though alternative embodiments may include more or fewer docks 320 within a charging station 310. Each dock 320 includes a dock connector 330. A dock connector 330 is a connector that provides power to a set of stacked shopping carts 300. The dock connector 330 may be positioned and structured such that a male charging connector (e.g., male charging connector 230) of a shopping cart 300 is inserted into the dock connector 330 when a shopping cart 300 is placed in a dock 320. In some embodiments, the dock connector 330 is substantially similar to a female charging connector (e.g., female charging connector 220) of a shopping cart 300.

The dock connector 330 provides power to shopping carts 300 that are stacked in the corresponding dock 320. The power from the shopping carts 300 may be evenly distributed among the shopping carts 300 that are stacked in the dock 320. Alternatively, the power may be directed towards certain shopping carts 300 such that those shopping carts 300 are charged before other shopping carts 300. For example, the shopping carts 300 may divert power from the dock connector 330 to the shopping cart 300 at the rear of the stack of shopping carts 300 such that the rear shopping cart 300 is charged before the other shopping carts 300. This ensures that the shopping cart 300 that is likely to be used next by a user is given charging priority over the other shopping carts 300.

In some embodiments, the shopping carts 300 are configured to identify whether a shopping cart 300 is stacked behind them. If a shopping cart 300 detects that another shopping cart 300 has been stacked into it, then the shopping cart 300 may be configured to route power received from the charging station 310, directly or through another shopping cart 300, to shopping carts 300 behind the shopping cart 300. If the shopping cart 300 does not detect that another shopping cart 300 is stacked into it, the shopping cart 300 may be configured to use power from the charging station 310 to charge its battery.

In some embodiments, the charging station 310 provides a cart identifier to the shopping carts 300 indicating which shopping carts 300 should be charged based on power from the charging station 310. The charging station 310 may communicate the cart identifier to shopping carts 300 stacked within a charging dock 320 e.g., through a control pin or through a network. Each shopping cart 300 stacked in the charging dock 320 may determine whether it is associated with the cart identifier. If a shopping cart 300 is not associated with the cart identifier, the shopping cart 300 routes power from the charging station 310 to the shopping carts 300 stacked into it. If the shopping cart 300 is associated with the cart identifier, the shopping cart 300 uses the power from the charging station to charge its battery.

Figure 4A:
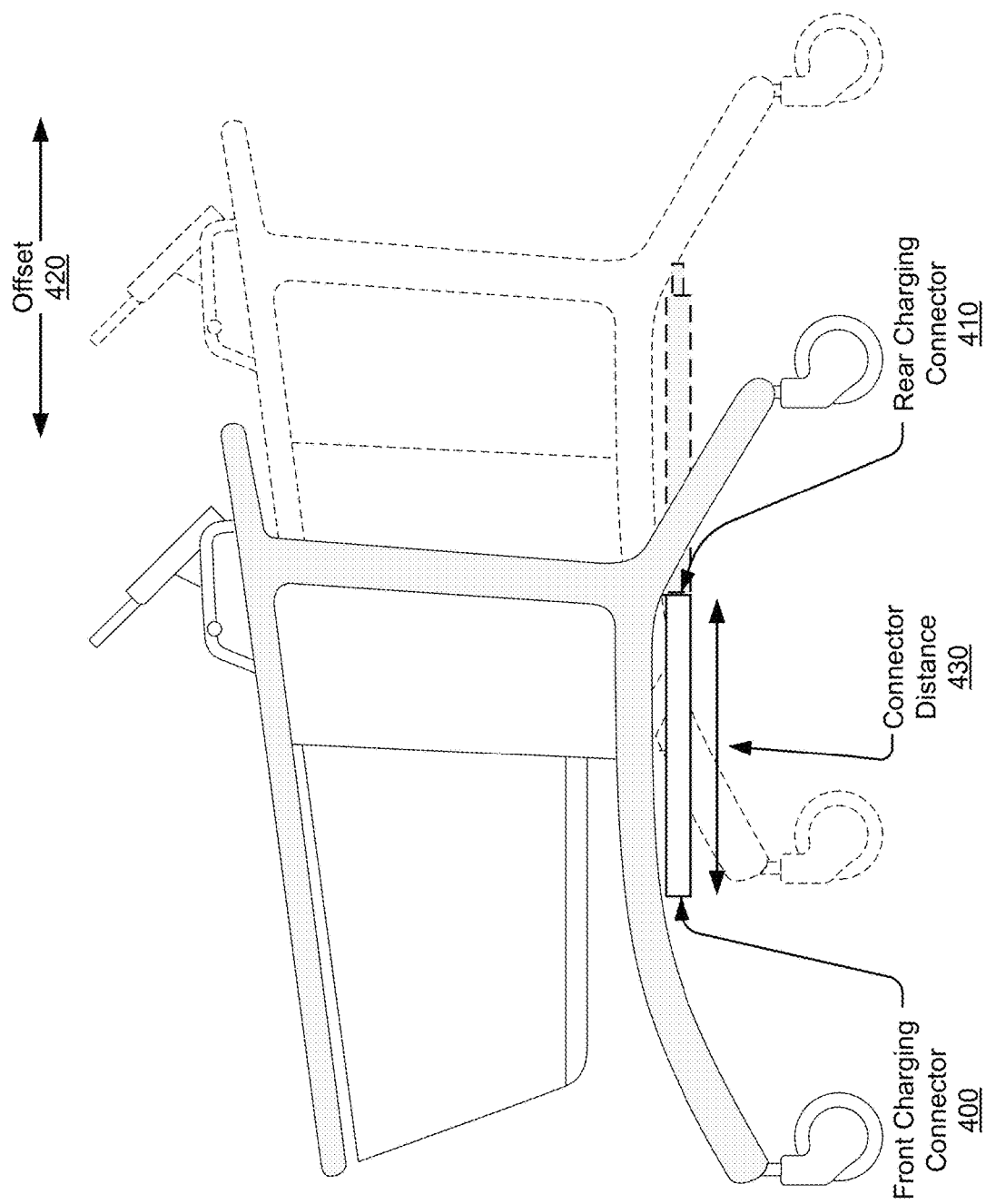
FIG. 4A illustrates a side, schematic view of shopping carts in a stacked configuration, in accordance with some embodiments.
Figure 4B:
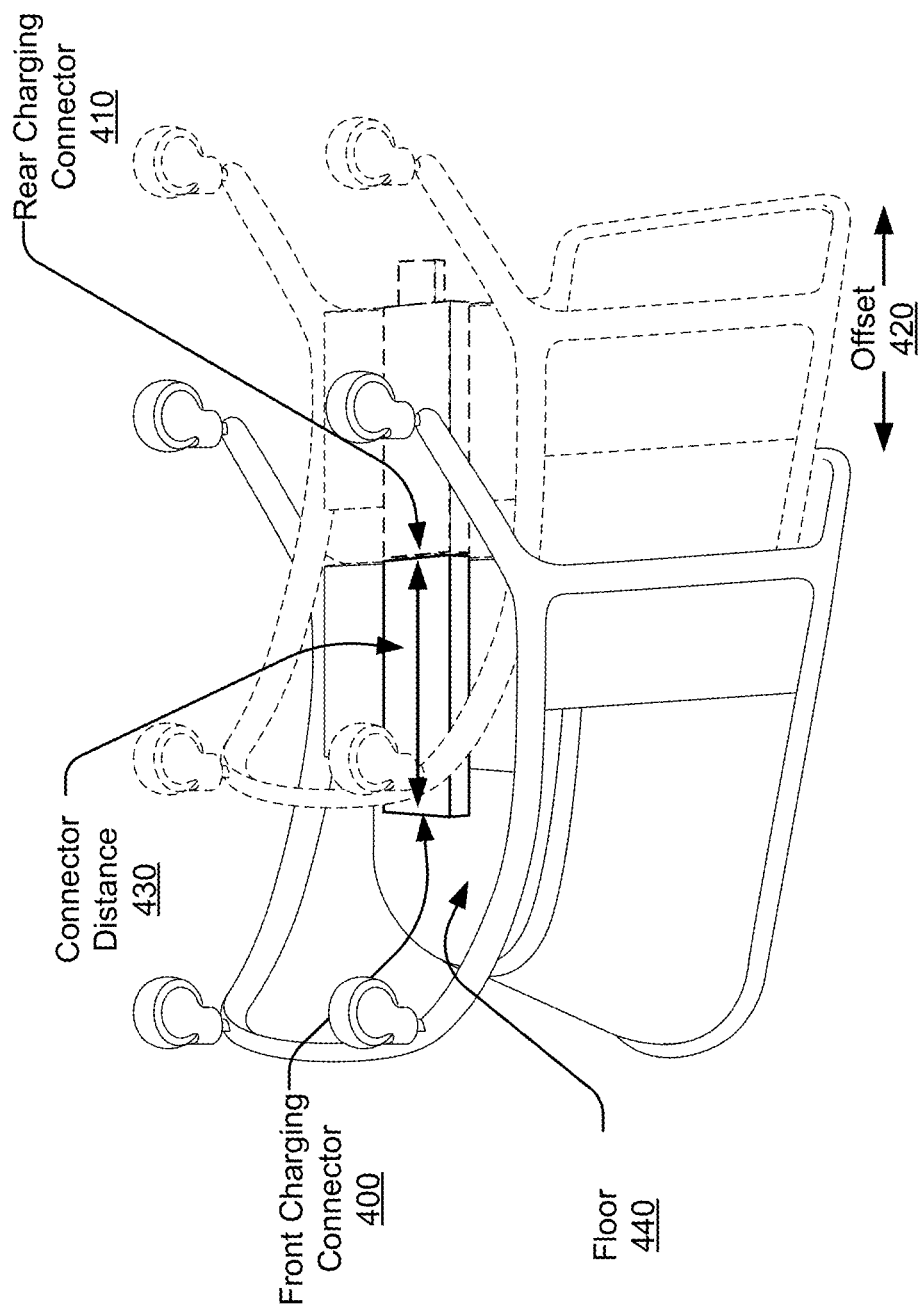
FIG. 4B illustrates a bottom-up, schematic view of the shopping carts in a stacked configuration, in accordance with some embodiments.

FIGS. 4A and 4B illustrate schematic views of shopping carts 300 in a stacked configuration, in accordance with some embodiments. FIG. 4A illustrates a side, schematic view of shopping carts 300 in a stacked configuration, and FIG. 4B illustrates a bottom-up, schematic view of the shopping carts 300 in a stacked configuration.

As illustrated in FIGS. 4A and 4B, the front charging connector 400 of one shopping cart is aligned with the rear charging connector 410. As noted above, the front charging connector 400 may be a male or female charging connector, while the rear charging connector 410 is the other type of charging connector.

FIGS. 4A and 4B illustrate how the offset 420 between stacked shopping carts relates to the distance 430 between the front charging connector 400 and the rear charging connector 410. The offset 420 between stacked shopping carts is substantially equivalent to the distance 430 between the front charging connector 400 and the rear charging connector 410. FIG. 4B additionally illustrates the charging connectors' position in relation to the floor 440 of the shopping carts.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A system comprising:
a first shopping cart and a second shopping cart, where each of the first shopping cart and the second shopping cart comprises:
a basket;
a plurality of wheels coupled to the basket;
a computing device coupled to the basket, wherein the computing device comprises a processor and a computer-readable medium;
a battery coupled to the computing device;
a front charging connector coupled to the basket, wherein the front charging connector is electrically coupled to the battery, and wherein the front charging connector is a male charging connector and comprises:
a first and second charging socket electrically coupled to the battery; and
a control socket that is coupled to the computing device; and
a rear charging connector coupled to the basket, wherein the rear charging connector is electrically coupled to the battery, and wherein the rear charging connector is electrically and mechanically coupled to the front charging connector, and wherein the rear charging connector is a female charging connector and comprises:
a first and second charging pin electrically coupled to the battery; and
a control pin that is coupled to the computing device, wherein the control pin is shorter than the first charging pin and the second charging pin such that, when the male charging connector of the second shopping cart is inserted into the female charging connector of the first shopping cart, the first and second charging pins of the female charging connector of the first shopping cart make physical contact with the first and second charging sockets of the male charging connector of the second shopping cart, respectively, before the control pin of the female charging connector of the first shopping cart makes physical contact with the control socket of the male charging connector of the second shopping cart;

wherein the second shopping cart is stackable within the first shopping cart such that the front charging connector of the second shopping cart is connected to the rear charging connector of the first shopping cart; and a charging station comprising a dock connector, wherein the first shopping cart and the second shopping cart can be docked within the charging station such that the front charging connector of the first shopping cart is connected to the dock connector of the charging station, wherein the dock connector of the charging station is substantially identical to the rear charging connector of the first shopping cart and the second shopping cart.

2. The system of claim 1, further comprising a controller comprising a computer-readable medium storing instructions that, when executed by a processor, cause the processor to:

determine that the second shopping cart is a last shopping cart in a stack of shopping carts that are coupled to the dock connector of the charging station; and responsive to determining the second shopping cart is the last shopping cart, cause the second shopping cart to charge with power received from the charging station.

3. The system of claim 2, wherein the controller is part of the computing device of the second shopping cart, and wherein instructions for determining that the second shopping cart is the last shopping cart further comprises instructions that cause the processor to:

determine that the rear charging connector of the second shopping cart is not connected to a front charging connector of another identical shopping cart.

4. The system of claim 1, wherein:

the system further comprises a controller comprising a computer-readable medium storing instructions that, when executed by a processor, cause the processor to:
transmit, to the first shopping cart and the second shopping cart, a cart identifier corresponding to the second shopping cart;

wherein the computer-readable medium of the computing device of the first shopping cart stores instructions that, when executed by the processor of the computing device of the first shopping cart, cause the processor of the computing device of the first shopping cart to:
receive the cart identifier corresponding to the second shopping cart;
determine that the cart identifier does not correspond to the first shopping cart; and
responsive to determining that the cart identifier does not correspond to the first shopping cart, route electrical power from the front charging connector to the rear charging connector of the first shopping cart; and wherein the computer-readable medium of the computing device of the second shopping cart stores instructions that, when executed by the processor of the computing device of the second shopping cart, cause the processor of the computing device of the second shopping cart to:
receive the cart identifier corresponding to the second shopping cart;
determine that the cart identifier corresponds to the second shopping cart; and
responsive to determining that the cart identifier corresponds to the second shopping cart, route electrical power from the front charging connector of the second shopping cart to the battery of the second shopping cart.

5. The system of claim 1, wherein the computer-readable medium of the computing device of the first shopping cart stores instructions that, when executed by the processor, cause the processor to:

detect whether the control pin of the first shopping cart is connected to the control socket of the second shopping cart; and responsive to detecting that the control pin of the first shopping cart is connected to the control socket of the second shopping cart, causing electrical power to flow from the female charging connector of the first shopping cart to the male charging connector of the second shopping cart.

6. The system of claim 1, wherein the charging station comprises a plurality of dock connectors.

7. A shopping cart comprising:

a basket;

a plurality of wheels coupled to the basket;

a computing device coupled to the basket, wherein the computing device comprises a processor and a computer-readable medium;

a battery coupled to the computing device;

a front charging connector coupled to the basket, wherein the front charging connector is electrically coupled to the battery, and wherein the front charging connector is a male charging connector and comprises:
a first and second charging socket electrically coupled to the battery; and
a control socket that is coupled to the computing device; and a rear charging connector coupled to the basket, wherein the rear charging connector is electrically coupled to the battery, and wherein the rear charging connector is electrically and mechanically coupled to the front charging connector, and wherein the rear charging connector is a female charging connector and comprises:
a first and second charging pin electrically coupled to the battery; and
a control pin that is coupled to the computing device, wherein the control pin is shorter than the first charging pin and the second charging pin;

wherein the front charging connector and the rear charging connector are positioned on the basket such that, when the shopping cart is stacked within another identical shopping cart, a first distance between the front charging connector and the rear charging connector of the shopping cart is equal to a second distance of an offset of the shopping cart with the other identical shopping cart, and wherein the control pin is shorter than the first charging pin and the second charging pin such that, when the male charging connector of the shopping cart is inserted into the female charging connector of the other identical shopping cart, the first and second charging pins of the female charging connector of the other identical shopping cart make physical contact with the first and second charging sockets of the male charging connector of the shopping cart, respectively, before the control pin of the female charging connector of the other identical shopping cart makes physical contact with the control socket of the male charging connector of the shopping cart.

8. The shopping cart of claim 7, wherein the computer-readable medium of the computing device of the shopping cart stores instructions that, when executed by the processor, cause the processor to:
  detect whether the control pin of the other identical shopping cart is connected to the control socket of the shopping cart; and
  responsive to detecting that the control pin of the other identical shopping cart is connected to the control socket of the shopping cart, causing electrical power to flow from the female charging connector of the other identical shopping cart to the male charging connector of the other cart.

9. The shopping cart of claim 7, wherein the front charging connector is a female charging connector, and wherein the rear charging connector is a male charging connector.

10. The shopping cart of claim 7, wherein the front charging connector and the rear charging connector are positioned on the shopping cart such that, when the shopping cart is stacked within the shopping cart, the front charging connector of the shopping cart is connected to the rear charging connector of the other identical shopping cart.

11. The shopping cart of claim 7, wherein the front charging connector and the rear charging connector are coupled to a floor of the basket of the shopping cart.

12. The shopping cart of claim 7, wherein the computing device comprises a user interface.

13. The shopping cart of claim 12, further comprising one or more cameras that are coupled to the computing device.

14. The shopping cart of claim 12, further comprising one or more sensors that are coupled to the computing device.

15. The shopping cart of claim 7, wherein the front charging connector is positioned such that the front charging connector of the shopping cart is connected to a rear charging connector of the other identical shopping cart.

* * * * *